US005782221A

United States Patent [19]

Woldt

[11] Patent Number: 5,782,221

[45] Date of Patent: Jul. 21, 1998

[54] METHOD AND APPARATUS FOR DECREASING THE LOAD CHANGE REACTIONS IN A MOTOR VEHICLE

[75] Inventor: Sven Woldt, Vaesterlanda, Sweden

[73] Assignee: Robert Bosch GmbH, Stuttgart, Germany

[21] Appl. No.: 735,694

[22] Filed: Oct. 23, 1996

[30] Foreign Application Priority Data

Dec. 20, 1995 [DE] Germany ........................ 195 47 717.0

[51] Int. Cl.$^6$ ............................ F02D 41/04; B60K 27/08

[52] U.S. Cl. .......................... 123/436; 123/325; 123/493; 180/197; 701/72

[58] Field of Search ..................................... 123/325, 326, 123/493, 357, 352, 436; 180/197; 364/426.32, 426.16, 426.018, 424.098

[56] References Cited

U.S. PATENT DOCUMENTS

| | | | |
|---|---|---|---|
| 3,802,528 | 4/1974 | Leiber | 180/197 |
| 4,598,679 | 7/1986 | Ohkumo et al. | 123/325 |
| 4,966,111 | 10/1990 | Fujimoto et al. | 123/339.16 |
| 5,113,820 | 5/1992 | Flaig | 123/325 |
| 5,168,953 | 12/1992 | Naito | 180/197 |
| 5,224,043 | 6/1993 | Tamura et al. | 364/426.032 |
| 5,313,922 | 5/1994 | Demel | 123/333 |

*Primary Examiner*—Tony M. Argenbright
*Assistant Examiner*—Hieu T. Vo
*Attorney, Agent, or Firm*—Felfe & Lynch

[57] ABSTRACT

Power to the driven wheels is increased when the motor vehicle is traveling around a curve and the driver suddenly releases the gas pedal. A sudden release of the gas pedal is recognized when the rate of change of pedal position or the engine speed exceeds a threshold on the negative direction, or when the speeds of the driven wheels are less than the speeds of the non-driven wheels.

18 Claims, 3 Drawing Sheets

METHOD AND APPARATUS FOR DECREASING THE LOAD CHANGE REACTIONS IN A MOTOR VEHICLE

BACKGROUND OF THE INVENTION

The invention pertains to a method and an apparatus for decreasing the reactions of motor vehicles to load changes by increasing power to the driven wheels under certain operating conditions.

A method of this type is known from U.S. Pat. No. 5,313,922, for example. Under certain operating conditions, e.g., when the internal combustion engine of the motor vehicle is operating in thrust mode while the vehicle is traveling around a curve, the specified amount of fuel to be supplied differs from that which would have been specified for a vehicle traveling straight ahead under otherwise identical conditions. It is provided that, while the vehicle is traveling around a curve, the amount of fuel to be supplied is greater than that during straight-ahead travel. As a result, the engine drag torque is limited or reduced while the vehicle is traveling around the curve. Measures for limiting the engine drag torque in a load change situation are not described.

It is known from U.S. Pat. No. 5,113,820 that, to avoid excessive engine drag torque, the braking moment occurring in thrust mode can be limited to a value which prevents a protracted locking of the driven wheels. The speed-dependent amount of residual fuel to be injected into the internal combustion engine is controlled as a function of time so that the drag torque does not reach unacceptably high values. The time-dependent decrease or increase in the amount of residual fuel for injection occurs in a ramp-like manner. This patent also fails to propose any measures for decreasing the load change reactions.

SUMMARY OF THE INVENTION

According to the invention, the power is increased when a load change is recognized. A load change is recognized by a sudden change in gas pedal position, sudden drop in engine speed, or speeds of the driven wheels being less than the speeds of the non-driven wheels.

The method according to the invention effectively decreases the reactions of motor vehicles to load changes without having any significant effect on the usually desirable braking torque of the engine.

It is especially advantageous that the invention can be realized simply by an engine control unit. As a result, load change reactions can be realized very quickly and without complicated measures.

DESCRIPTION OF EXEMPLARY EMBODIMENTS

Figure 1:
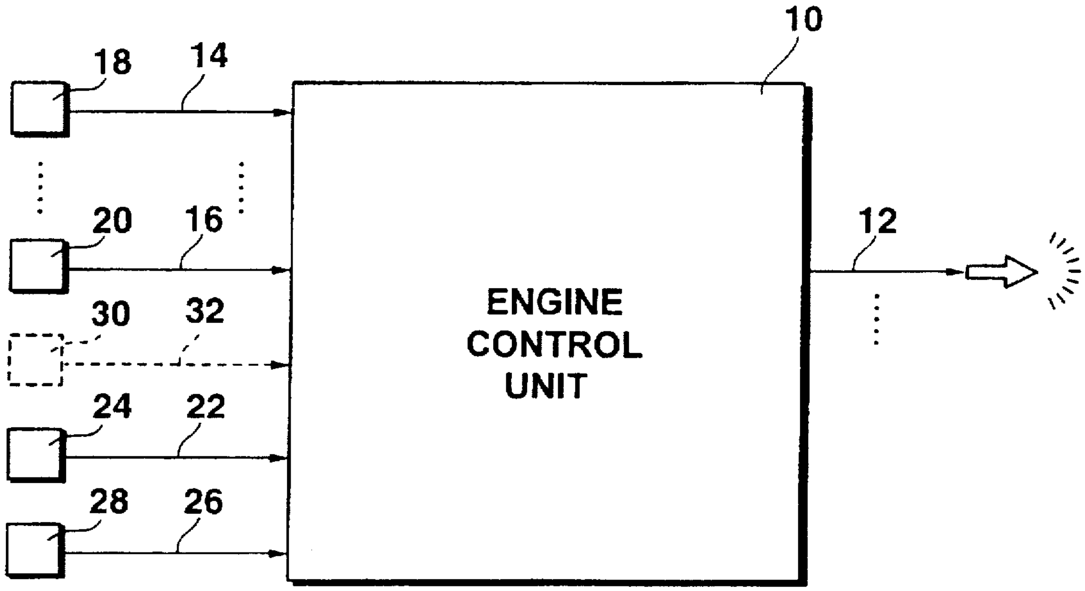
FIG. 1 shows an electronic engine control unit having inputs and outputs.

FIG. 1 shows an electronic engine control unit 10, which controls at least the supply of fuel to an internal combustion engine (symbolized by line 12). Various operating variables of the engine and of the vehicle are transmitted to electronic engine control unit 10, possibly over a data bus. The wheel speed signals of the vehicle are transmitted over input lines 14–16 from corresponding sensors 18–20. A measure of the engine speed is sent to control unit 10, over a line 22, which proceeds from a measuring device 24 for detecting the rpm's of the engine. A measure for the position of the gas pedal is transmitted over a line 26 coming from a measuring device 28. In addition, in a preferred exemplary embodiment, information on the steering angle is transmitted to control unit 10 from a steering angle sensor 30 over a line 32. The input and output signals of control unit 10 described above have been limited for the sake of clarity to signals which are essential to the invention. In reality, control unit 10 has, of course, additional input and output lines, over which additional information on the operating conditions of the internal combustion engine and/or the vehicle are transmitted and over which additional operating parameters of the internal combustion engine and/or the vehicle are controlled (e.g., ignition, throttle valve, etc.).

Despite modern chassis design, load change reactions can still lead to critical behavior of the vehicle. This is especially true when the driver releases the gas pedal abruptly while the vehicle is traveling around a curve at near the limit velocity. Most vehicles then show the driving behavior known as oversteering. This can be decreased and, in the ideal case, avoided completely by preventing the engine drag torque, which develops during the change-of-load situation, from exerting its full effect.

The basic idea of the invention is that, when a load change occurs while the vehicle is traveling around a curve, the engine power is not adjusted to the value which the engine control unit would calculate under the same operating conditions for straight-ahead travel (amount of fuel, amount of air); instead, the power is first increased to a value greater than this power and then decreased to the level for straight-ahead travel. A load change is recognized when the signal for the position of the gas pedal and/or the signal for the speed of the engine shows rapid change, or when the signals for the speed of the wheels show that the speed of the driven wheels is slower than that of the nondriven wheels. These criteria are used both individually and also in any desired combination to recognize a load change.

In the preferred exemplary embodiment, when the driver releases the gas pedal completely, the fuel is not cut off while the engine is in thrust mode. Instead, a fixed or variable value for the amount of fuel is supplied, this value being located on or below the friction or no-load steady-state characteristic curve stored in a characteristic diagram. This has the result of decreasing the load change reaction caused by the engine drag torque when no fuel is being injected or when suddenly the amount of fuel being injected is reduced.

Once the danger of instability is over, e.g., after the vehicle has left the curve, when the speed of the driven wheels is essentially the same as that of the nondriven wheels, and/or after a predetermined time has elapsed, the engine power is reduced along a time ramp to the value determined for straight-ahead travel.

The solution according to the invention can be applied advantageously to any recognized load change. In a preferred exemplary embodiment, the decrease in the load change reaction is implemented only when the driver releases the pedal in such a way that the internal combustion engine would enter thrust operating mode under complete cutoff of the fuel supply.

The conventional power parameters of a drive unit are available to influence the engine power. In internal combustion engines, these include the amount of fuel, the air feed, and, in a supportive role, the ignition angle. In diesel engines, the amount of fuel is influenced; in the case of spark/ignition engines, one or another of the parameters cited above or a suitable combination of these variables is influenced, depending on the application.

In an advantageous manner, the engine control unit either reads the wheel speeds directly from the wheels or accepts them over a data bus from an anti-lock system. In this exemplary embodiment, the algorithms used to recognize a curve are executed in the engine control unit. Similar information on whether or not the vehicle is traveling around a curve can also be transmitted over a data bus to the engine control unit by an ABS. The entire engine drag torque control function is preferably implemented in the engine control unit.

Figure 2:
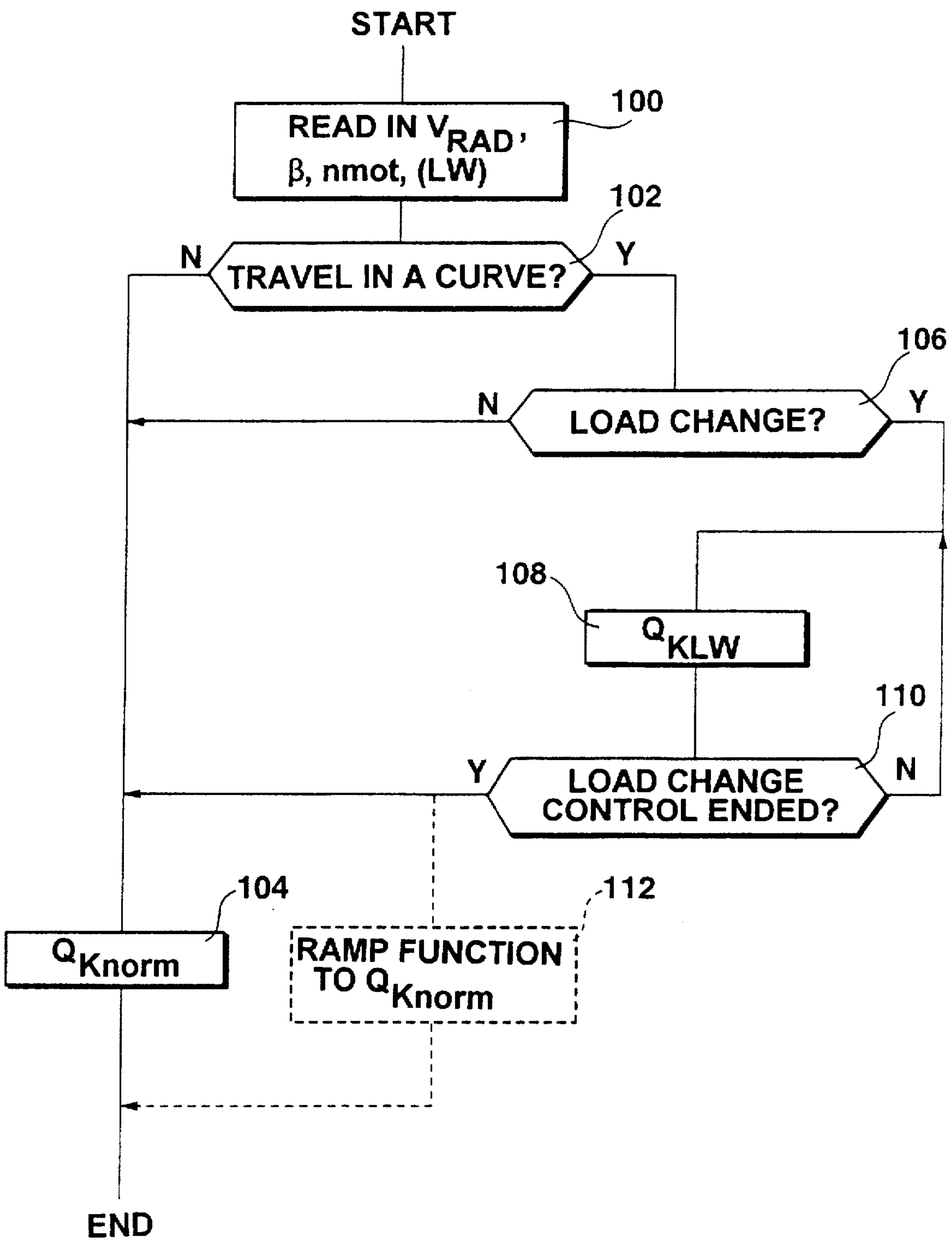
FIG. 2 is a flow diagram of the computer program which runs in the microcomputer of the control unit.

FIG. 2 shows the solution according to the invention in the form of a flow chart, which is based on an exemplary embodiment in which only the amount of fuel is influenced.

The subprogram is called up at predetermined times, and once it has started, the first thing it does, in step 100, is to read in the operating variables necessary for implementing the solution according to the invention. These are, in a preferred exemplary embodiment, the wheel speeds $V_{radi}$, the gas pedal position β, and/or the engine rpm's $N_{mot}$ and possibly the steering angle LW. Then, in step 102, the program checks to see whether the vehicle is driving around a curve. This is achieved, for example, by the use of the known curve detection algorithms on the basis of wheel speeds and/or by evaluation of the steering angle signal. If the vehicle is not traveling around a curve, step 104 supplies the amount of fuel $Q_{Knorm}$ assigned to the operating condition present (e.g., on the basis of the engine rpm's and the engine load). If step 102 has shown that the vehicle is traveling around a curve, step 106 checks to see whether a load change is present. This check is undertaken on the basis of the rate at which the gas pedal position is changing and/or the engine rpm's are changing. If the rate of change of the gas pedal position and/or of the engine rpm's exceeds in the negative direction a predetermined threshold value, the program assumes that load change reactions (with the possibility of subsequent instabilities) are beginning. An alternative or supplemental possibility of recognizing load changes is to compare the wheel speeds of the driven wheels with those of the nondriven wheels. If the wheel speeds of the driven wheels are below those of the nondriven wheels, a load change is recognized. In the preferred exemplary embodiment, all three criteria are evaluated individually to recognize load changes. If step 106 has found that no load change is present, step 104 is initiated. If one of the criteria is satisfied, a load change is assumed. Then, in step 108, the amount of fuel $Q_{KLW}$ predetermined for the load change, possibly variable, is supplied. This is usually greater than the amount supplied under normal operating conditions (straight-ahead travel, traveling around a curve without a load change). In the preferred exemplary embodiment, the process of decreasing the load change reactions is initiated only if the fuel supply would be cut off under normal operating conditions. In this case, the amount of fuel supplied in step 108 will be on or below the friction or no-load steady-state characteristic curve. After step 108, the program checks in step 110 to see whether the load change control is over. This is the case when the curve has been completed, when the wheel speeds of the driven wheels are approximately the same as or greater than those of the nondriven wheels, and/or when a pre-determined time since the beginning of the load change control (step 106) has elapsed. If the load change control is not over, the amount of fuel $Q_{KLW}$ (step 108) continues to be supplied; and when the load change control process is finally over, step 104 is initiated. In a preferred exemplary embodiment, however, a time ramp is provided in step 112, over which the amount of fuel is regulated downward from the load change value $Q_{KLW}$ to the value $Q_{Knorm}$ normal for the operating state. The subprogram then terminates after step 104 or step 112.

In an advantageous exemplary embodiment, the amount of fuel supplied during load change control is a function of operating variables. The amount of fuel is preferably controlled a function of time, of rpm's, and/or of load. The amount of fuel decreases as the length of time since the beginning of load change control increases and increases with increasing rpm's and/or load.

Figure 3A:
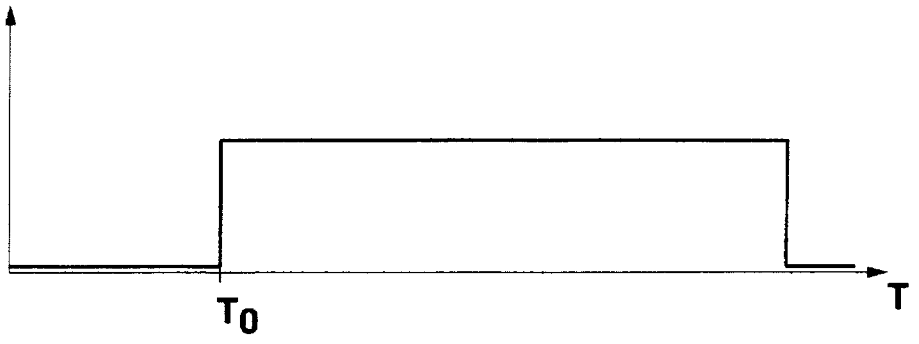
FIG. 3*a* is a time graph indicating curve recognition.
Figure 3B:
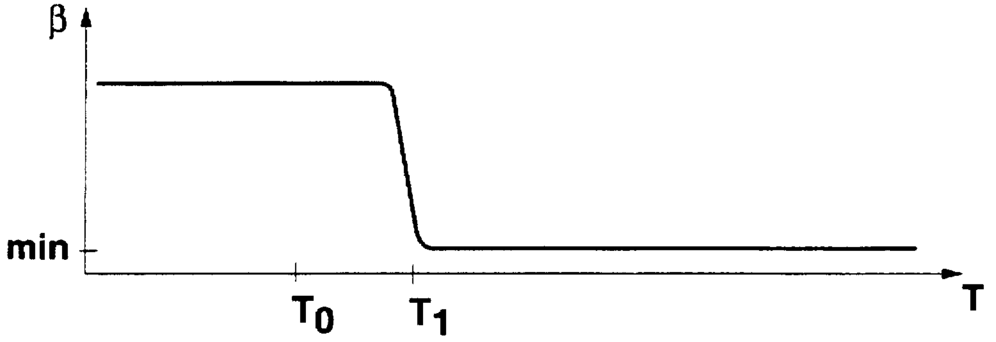
FIG. 3*b* is a time graph indicating gas pedal position.
Figure 3C:
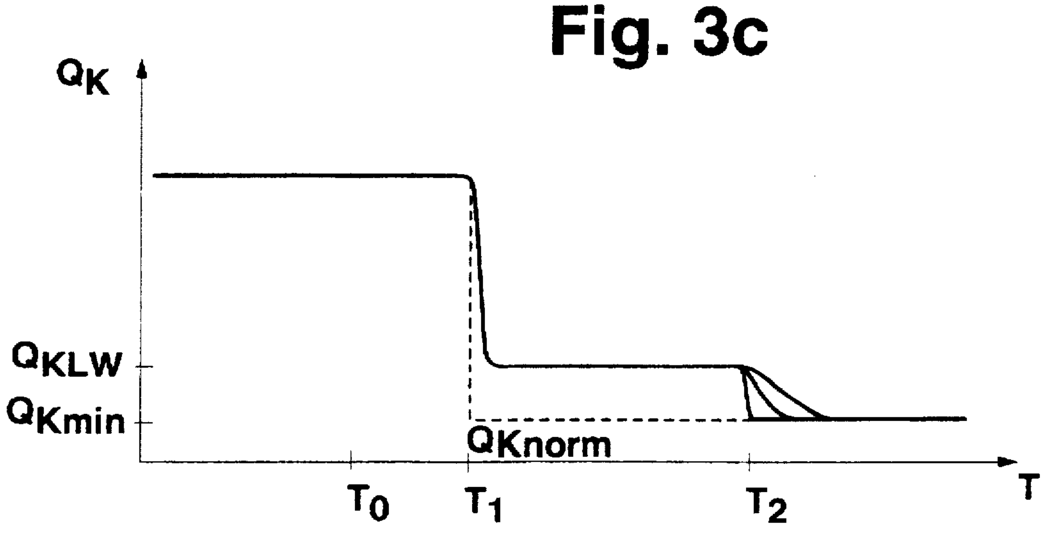
FIG. 3*c* is a time graph indicating fuel supply to the engine.

FIG. 3 illustrates the solution according to the invention on the basis of time graphs. FIG. 3*a* shows the recognition of a curve; FIG. 3*b* shows the position of the gas pedal; and FIG. 3*c* shows the amount of fuel supplied to the engine. At a certain time $T_0$, the vehicle enters a curve. The driver releases the gas pedal abruptly at time $T_1$, so that load change reactions are likely to occur. Since, at time $T_1$, the driver has released the gas pedal, under normal operating conditions the amount of fuel to be supplied would change at time $T_1$ to its minimum value, preferably 0. But because the rate at which the position of the gas pedal changed at time $T_1$ exceeds the predetermined limit, the amount of fuel which is injected is not the minimum amount but rather the load change control amount $Q_{KLW}$. At time $T_2$, the load change control is ended, and thus the amount of fuel to be supplied is regulated downward from the load change value to the minimum value in accordance with a selectable function.

The solution according to the invention is also suitable in a corresponding manner for decreasing the load change reactions which occur during straight-ahead travel.

I claim:

1. Method for decreasing a load change reaction in a vehicle having pedal and an engine which generates power for driven wheels, said method comprising:

monitoring at least one of engine speed and gas pedal position, adjusting the power of the engine as a function of at least one of said engine speed and said gas pedal position, determining at least one of a rate of change of the gas pedal position and a rate of change of the engine speed, recognizing a load change situation when, irrespective of the gas pedal position, at least one of said rate of change of said gas pedal position and said rate of change of said engine speed exceeds a predetermined value representing fast release of the gas pedal, increasing said power is adjusted as a function of at least one of said engine speed and gas pedal position responsive to said recognition of a load change situation.

2. Method according to claim 1 comprising determining a rate of change of gas pedal position and recognizing a load change situation when said rate of change of pedal position exceeds a predetermined value in a negative direction.

3. Method according to claim 1 comprising determining a rate of change of engine speed and recognizing a load change situation when said rate of change of engine speed exceeds a predetermined value in a negative direction.

4. Method according to claim 1 comprising monitoring the speeds of the driven and non-driven wheels, comparing the speeds of the driven wheels to the speeds of the non-driven wheels, and recognizing a load change situation when the speeds of the driven wheels are less than the speeds of the non-driven wheels.

5. Method according to claim 1 further comprising determining when the vehicle is traveling around a curve and increasing said power only when said vehicle is traveling around a curve.

6. Method according to claim 1 wherein said power is increased by supplying a predetermined amount of fuel to said engine.

7. Method according to claim 6 wherein said predetermined amount of fuel is a function of at least one of said engine speed and said gas pedal position.

8. Method according to claim 1 wherein a load change situation is no longer recognized after a predetermined time has elapsed since said load change situation was initially recognized.

9. Method as in claim 1 wherein said power is decreased in accordance with a predetermined function when a load change situation is no longer recognized.

10. Apparatus for decreasing a load change reaction in a vehicle having an engine which generates power for driven wheels, said apparatus comprising:

an electronic control unit for controlling power generated by said engine, said control unit comprising means for monitoring at least one of engine speed and gas pedal position, means for adjusting the power of the engine as a function of at least one of said engine speed and said gas pedal position, means for determining at least one of a rate of change of the gas pedal position and a rate of change of the engine speed, means for recognizing a load change situation when, irrespective of the gas pedal position, at least one of said rate of change of said engine speed and said rate of change of said gas pedal position exceeds a predetermined value representing fast release of the gas pedal, and means for increasing said power is adjusted as a function of at least one of said engine speed and gas pedal position responsive to recognition of a load change situation.

11. Apparatus according to claim 10 wherein said means for determining determines the rate of change of gas pedal position, and said means for recognizing recognizes a load change situation when said rate of change of pedal position exceeds a predeternined value in a negative direction.

12. Apparatus according to claim 10, wherein said means for determining determines the rate of change of engine speed, and said means for recognizing recognizes a load change situation when said rate of change of engine speed exceeds a predetermined value in a negative direction.

13. Apparatus according to claim 10, and further comprising means for monitoring speeds of the driven wheels and of non-driven wheels of the vehicle, means for comparing the speeds of the driven wheels to the speeds of the non-driven wheels, and said means for recognizing recognizes a load change situation partly responsive to the speeds of the driven wheels being less than the speeds of the non-driven wheels.

14. Apparatus according to claim 10, and further comprising means for determining when the vehicle is traveling around a curve and said means for increasing said power increases said power only when said vehicle is traveling around a curve.

15. Apparatus according to claim 10, wherein said power is increased by supplying a predetermined amount of fuel to said engine.

16. Apparatus according to claim 15, wherein said predetermined amount of fuel is a function of at least one of said gas pedal position and said engine speed.

17. Apparatus according to claim 10, wherein a load change situation is no longer recognized after a predetermined time has elapsed since said load change situation was initially recognized.

18. Apparatus as in claim 10, wherein said power is decreased in accordance with a predetermined function when a load change situation is no longer recognized.

* * * * *